US009058468B2

(12) United States Patent
Koukine et al.

(10) Patent No.: US 9,058,468 B2
(45) Date of Patent: Jun. 16, 2015

(54) SYSTEM AND METHOD FOR PREVENTING UNAUTHORISED USE OF DIGITAL MEDIA

(75) Inventors: Anton Valerievich Koukine, Auckland (NZ); Owen Michael Means, Auckland (NZ); Sean Joseph Higgins, Auckland (NZ); Paul Osborne, Auckland (NZ)

(73) Assignee: Google Technology Holdings LLC, Mountain View, CA (US)

( * ) Notice: Subject to any disclaimer, the term of this patent is extended or adjusted under 35 U.S.C. 154(b) by 232 days.

(21) Appl. No.: 12/809,793

(22) PCT Filed: Dec. 19, 2008

(86) PCT No.: PCT/NZ2008/000345
§ 371 (c)(1),
(2), (4) Date: Aug. 24, 2010

(87) PCT Pub. No.: WO2009/082245
PCT Pub. Date: Jul. 2, 2009

(65) Prior Publication Data
US 2011/0030069 A1    Feb. 3, 2011

Related U.S. Application Data

(60) Provisional application No. 61/008,561, filed on Dec. 21, 2007.

(51) Int. Cl.
*G06F 7/04*    (2006.01)
*G06F 21/10*   (2013.01)
*G06F 21/57*   (2013.01)
(Continued)

(52) U.S. Cl.
CPC ................ *G06F 21/10* (2013.01); *G06F 21/57* (2013.01); *H04L 63/101* (2013.01); *H04L 63/102* (2013.01); *H04L 2463/101* (2013.01)

(58) Field of Classification Search
CPC ........................................................ G06F 21/10
USPC ............................................................ 726/29
See application file for complete search history.

(56) References Cited

U.S. PATENT DOCUMENTS 7,984,500 B1 *   7/2011   Khanna et al. .................. 726/22
2003/0226033 A1 * 12/2003 Zinda et al. .................... 713/201
(Continued)

FOREIGN PATENT DOCUMENTS

WO    2007074420 A2    7/2007

OTHER PUBLICATIONS

PCT International Search Report and Written Opinion for PCT/NZ2008/000345. Issued on May 26, 2009.
(Continued)

*Primary Examiner* — Ashok Patel
*Assistant Examiner* — Gary Gracia
(74) *Attorney, Agent, or Firm* — Fenwick & West LLP

(57) ABSTRACT

A method for protecting digital media content from unauthorized use on a client, is described. The method comprising the steps of receiving from a server on the client a list of processes, instructions, activity descriptions or data types that must not be active simultaneously with playback of the digital media content ("the blacklist"). The method further comprising checking, on the client, for the presence of any items on the list; and continuing interaction with the server, key management and playback of protected content only if no items on the list are detected on the client. A system is also described.

16 Claims, 7 Drawing Sheets

(51) Int. Cl.
  *G06F 17/30*    (2006.01)
  *H04L 29/06*    (2006.01)

(56) References Cited

U.S. PATENT DOCUMENTS

| | | | |
|---|---|---|---|
| 2005/0080898 A1* | 4/2005 | Block | 709/225 |
| 2005/0105884 A1* | 5/2005 | Satoh et al. | 386/69 |
| 2005/0138406 A1 | 6/2005 | Cox | |
| 2005/0257251 A1 | 11/2005 | McKune et al. | |
| 2006/0021057 A1* | 1/2006 | Risan et al. | 726/26 |
| 2006/0062073 A1* | 3/2006 | Kitani et al. | 365/232 |
| 2006/0155651 A1 | 7/2006 | Oh et al. | |
| 2007/0025534 A1* | 2/2007 | Yezhuvath et al. | 379/114.14 |
| 2007/0033419 A1* | 2/2007 | Kocher et al. | 713/193 |
| 2007/0074289 A1* | 3/2007 | Maddaloni | 726/23 |
| 2007/0094260 A1* | 4/2007 | Murphy et al. | 707/9 |
| 2007/0156895 A1* | 7/2007 | Vuong | 709/225 |
| 2007/0220607 A1* | 9/2007 | Sprosts et al. | 726/24 |
| 2007/0230348 A1* | 10/2007 | Zhong | 370/235 |
| 2008/0005560 A1* | 1/2008 | Duffus et al. | 713/164 |
| 2008/0034314 A1* | 2/2008 | Louch et al. | 715/778 |
| 2008/0046731 A1* | 2/2008 | Wu | 713/171 |
| 2008/0052510 A1* | 2/2008 | Kim et al. | 713/158 |
| 2008/0086555 A1* | 4/2008 | Feinleib | 709/224 |
| 2008/0128495 A1* | 6/2008 | Weintraub et al. | 235/382 |
| 2008/0133938 A1* | 6/2008 | Kocher et al. | 713/193 |
| 2008/0134046 A1* | 6/2008 | Gray et al. | 715/736 |
| 2009/0217320 A1* | 8/2009 | Aldrey | 725/37 |

OTHER PUBLICATIONS

Office Action, Korean App. No. 10-2010-7016183 (Foreign Text and English Translation), Nov. 23, 2011.
Office Action for Canadian Patent Application No. CA-2,707,934, Dec. 17, 2013, 3 Pages.

* cited by examiner

BLACK LIST

| ITEM | PRIORITY |
|---|---|
| SoftICE | 1 |
| Video screen scraper | 1 |
| Debugger | 1 |
| Graph Editor | 2 |
| .... | 2 |
| ..... | 2 |

GREY LIST — 70

| ITEM | RATING |
|---|---|
| SoftICE | 50 |
| Video screen scraper | 50 |
| Debugger | 50 |
| Graph Editor | 10 |
| .... | 10 |
| .... | 10 |

SYSTEM AND METHOD FOR PREVENTING UNAUTHORISED USE OF DIGITAL MEDIA

FIELD OF INVENTION

The present invention relates to the prevention of digital media piracy.

BACKGROUND TO THE INVENTION

Distribution of media such as films over the internet to client computers is becoming more prevalent as film studios have begun to approve the process. However, piracy in this environment is a problem.

There has been a great deal of effort directed at preventing piracy of distributed digital media. One approach has been for the media provider to install executable code onto the client computer that reports to the media provider on the configuration and software running on the client computer. The media provider then assesses the client computer configuration to determine if it poses a piracy threat. If there is perceived to be a threat, the media provider declines or stops the download of media to the client computer. In some cases, code or data on the client computer is deleted or altered.

While it is important to safeguard delivered media from piracy, attention must be paid to client privacy and to the problem of false positives in the detection of piracy that result in subsequent alteration of the functionality of client systems. Quite apart from the potential for actual abuse, the bad publicity that comes with any perceived abuse on the part of the media provider can seriously affect consumer choice For example Sony root kit, Intel P3 ID, and Media Player GUIDs. It is also important that anti-piracy measures do not unduly affect the operation of the media delivery system. In particular, anti piracy measures that take an unduly long time and so delay the delivery of content are unattractive to users and are therefore commercially damaging for media providers.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

It is an object of the present invention to provide an anti-piracy system for delivered digital media that does not unduly compromise client privacy, or unduly compromise system performance, but that provides adequate protection for media providers or at least provides the public or industry with a useful choice.

In a first aspect, the invention may broadly be said to consist of a method for protecting digital media content from unauthorised use on a client, comprising the steps of:
 receiving from a server at the client a list of processes, instructions, activity descriptions or data types that must not be active simultaneously with playback of the digital media content;
 checking, on the client, for the presence of any items on the list; and
 continuing interactions with the server, key management and playback of protected content only if no items on the list are detected on the client.

Preferably, the step of checking comprises checking on the client for the presence of any items on the list that are active on the client.

Preferably the step of checking further comprises, where items on the blacklist are active on the client, processing a weighting for each active item and determining whether the processed weightings exceed a threshold.

Preferably, the method includes the step of periodically updating the list.

Preferably, the method is carried out as part of a session set up routine. This can be as part of an authentication routine or any other access manager protocol set up session.

Preferably, the method is carried out substantially continuously. Alternatively, the method may be carried out at predetermined intervals during the delivery and playback of digital media content or at other times.

Preferably, each of the items in the list has a priority value associated with it.

Preferably, digital rights or decryption keys or both, required for playback of the digital media, are delivered to the client via a server.

Preferably, the blacklist is received by the client along with the digital rights or decryption keys or both.

In a second aspect, the present invention may broadly be said to consist in a system for protecting digital media content from unauthorised use in a client, comprising:
 a blacklist server; and
 a client connected to the server over a network;
 wherein the blacklist server is adapted to transmit a blacklist of threatening processes, instructions, activity descriptions or data types to the client;
 wherein the client is adapted to run a checking process that checks for the presence of any items on the blacklist on the client; and
 wherein the client is adapted to continue interaction with the server, key management and playback of protected content with the server only if no items on the list are detected on the client.

Preferably, the system further includes a digital rights management system connected to the blacklist server, wherein digital rights information is sent to and from the client via the blacklist server.

Preferably the system is adapted to, if items on the blacklist are present on the client, process a weighting for each present item and determine whether the processed weightings exceed a threshold.

Preferably, the client is adapted to check for the presence of any items on the blacklist a plurality of times during playback of the digital media content.

Preferably, each item on the blacklist has an associated priority value.

In a third aspect, the present invention may broadly be said to consist in a machine readable medium that provides instructions for preventing unauthorised use of digital media, which, when executed by at least one processor on a client, cause the processor to perform the steps of:

receiving from a server a list of processes, instructions, activity descriptions or data types that must not be active simultaneously with playback of the digital media content;

checking, on the client, for the presence of any items on the list; and continuing interaction with the server only if no items on the list are detected on the client.

In a fourth aspect, the invention may broadly be said to consist of a method for protecting digital media content from unauthorised use on a client, comprising the steps of:

receiving from a server on the client a list of processes, instructions, activity descriptions or data types that must not be active simultaneously with playback of the digital media content;

checking, on the client, for the presence of any items on the list.

Preferably the client ceases interaction with the server if any items on the blacklist have been detected without passing any details relating to processes running on the client to the server.

Alternatively or additionally, the user might be alerted themselves. Diagnostics information could be recorded on the client and/or displayed to the user. Alternatively or additionally, diagnostics information could be sent to a service operator in order to assist the user.

In another aspect the present invention may be said to consist in a method of controlling playback of digital media content on a client comprising: accessing a blacklist of items, determining presence of items on the client that are on the blacklist, controlling playback of the digital media content on the client based on the presence of items on the client.

Preferably the playback is controlled by aborting playback if at least one item on the client is on the black list.

Preferably the blacklist comprises weightings and the method further comprises obtaining a weighting of items in the blacklist present on the client, and controlling playback based on the weighting.

In another aspect the present invention may be said to consist in a system for controlling playback of digital media content on a client comprising:

a blacklist of items, a process for determining presence of items on the client that are on the blacklist, a process for controlling playback of the digital media content on the client based on the presence of items on the client.

Preferably the playback is controlled by aborting playback if at least one item on the client is on the black list.

Preferably the blacklist comprises weightings and the system further comprises a process for obtaining a weighting of items in the blacklist present on the client, and controlling playback based on the weighting.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Examples of the present invention will now be described in detail with reference to the accompanying drawings, in which:

FIG. 5 is a block diagram of an example blacklist.

FIG. 7 is a block diagram of an example greylist.

DETAILED DESCRIPTION

Figure 1:
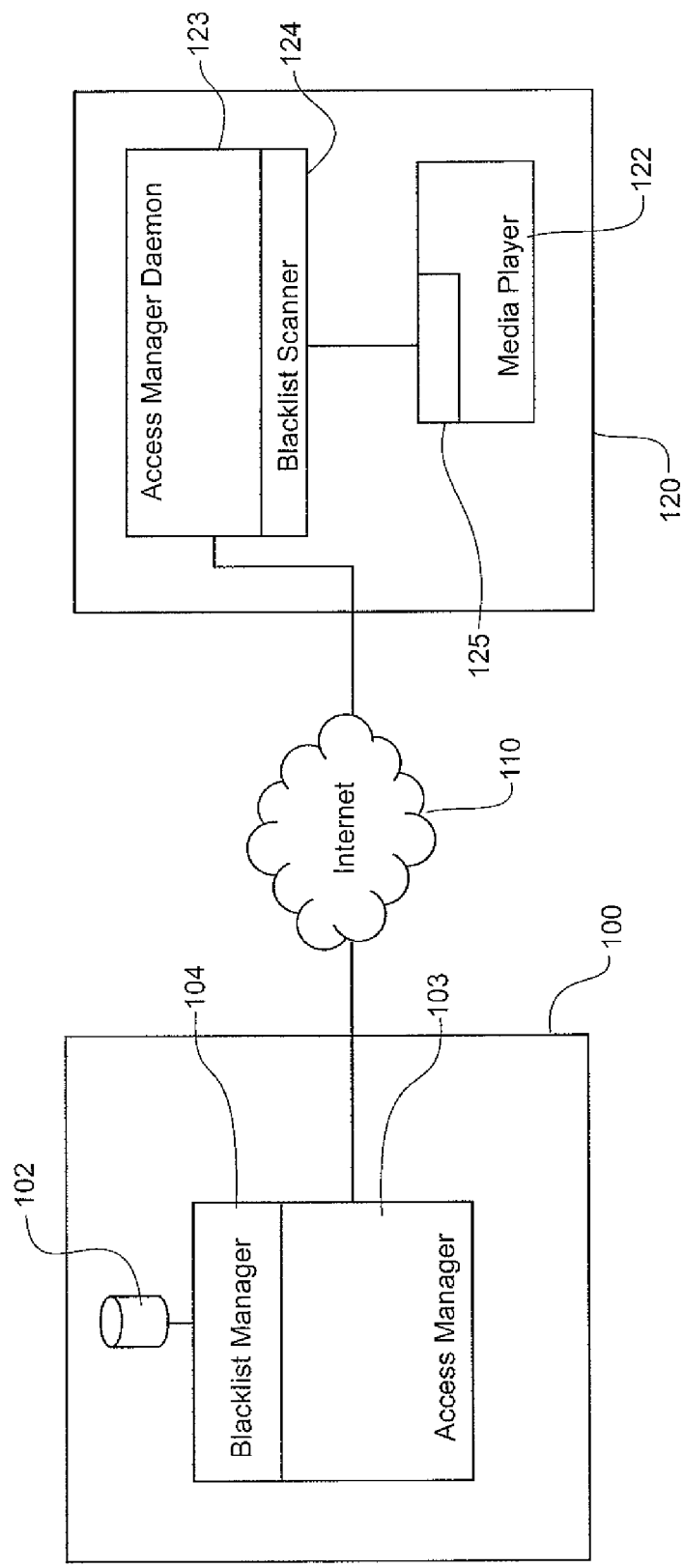
FIG. 1 is a schematic diagram of a client service system in accordance with the present invention.

FIG. 1 is a schematic diagram showing a basic client/server system in accordance with the present invention. Server 100 is connected over a network 110 to a client 120. The server 100 includes or is part of a digital rights management (DRM) system. The server 100 provides the client 120 with access to digital media. The server may simply handle DRM functions or may also handle delivery of the media and encryption processes as well. In a preferred embodiment, the server simply handles DRM functions. The server includes, or is connected to, a blacklist database 102. A blacklist manager 104 is connected to the blacklist database, the operation of which will be described later.

The network 110 will typically be the Internet but may also include local area networks (LANs), wide area networks (WANs) and direct connections.

The client 120 is any client capable of playing digital media for example a personal computer, set top box or pda. The client 120 as shown in FIG. 1 includes a media player 122, such as Real Player or Windows Media Player. Also running on the client, and associated with the media player 122, is an access manager 123 including a blacklist scanner 124.

The present invention provides protection against unauthorised use of digital media by checking the client system for threatening processes or data types running on the client system. The blacklist database includes an updated list of threatening processes and data types. In operation, following a request from the client for digital media, the blacklist manager 104 sends a list taken from the blacklist database 102 to the blacklist scanner running on the client over the network 110. The blacklist scanner checks the client for the presence of any of the items on the list running on the client. The blacklist scanner 124 can be configured to check particular locations on the client such as the system configuration data stored for example in the /etc. directory on an embedded Unix platform or the registry on a Microsoft Windows PC and task list, or may check the entire client including the hard disk if there is one.

The DRM procedure, decryption key management or media download can continue while the scanner carries out checks. If the blacklist scanner 124 detects the presence of an item on the list, the access manager 123 exits and breaks the communication channel with the server 100 and all associated processes cease.

The media player also has an embedded anti-piracy component, the decryption plug-in library 125.

The plug-in library is associated with the access manager daemon and when an item on the blacklist is detected on the client 120, the plug-in library acts to prevent the media player from decrypting any media files or streams associated with the anti-piracy service. The media player is not disabled from playing other media, only the media requested via the access manager daemon interface. This may be achieved by deleting the keys necessary for decryption of the media from the plug-in library.

This scanning process can be limited to checking for items running on the client and can be carried out at intervals during registration, secure channel set up, download and playing of digital media files. The scanning process may be carried out on a continuous basis in the background and asynchronously to any other processes. The blacklist transfer and scanning process is optionally part of the set up of a secure channel between the client and the server.

Examples of threatening processes that could be included on the blacklist are debuggers, videoframe grabbers. The list may include file or program names, digital signatures associated with threatening processes, registry entries.

The list may be prioritised so that, once certain checks have been made, the media decryption process can continue while further checks are made in the background. The choice of the number of checks made before any further processes can continue is a balance between providing a user friendly system and providing security for the media.

Different levels of security may be implemented in the system of the present invention depending on the perceived level of threat. If at a particular time there is known to be threatening software of a certain type in wide circulation, the corresponding item on the blacklist can be given high priority and checked for more frequently than during normal operation.

Following termination of a connection with the access manager server because of a detected threat, assuming the threat is no longer active on the client, standard reconnection can occur without any detrimental affect on the client software. Optionally, the client may be required to re-register with the media provider if there is an increased perceived threat level at that time. Tamper detection is possible without any information about the software or data on the client being necessary reported to the access manager server (apart from the access manager daemon version number).

Alternatively the required current version may be downloaded to the client and checked.

Figure 2:
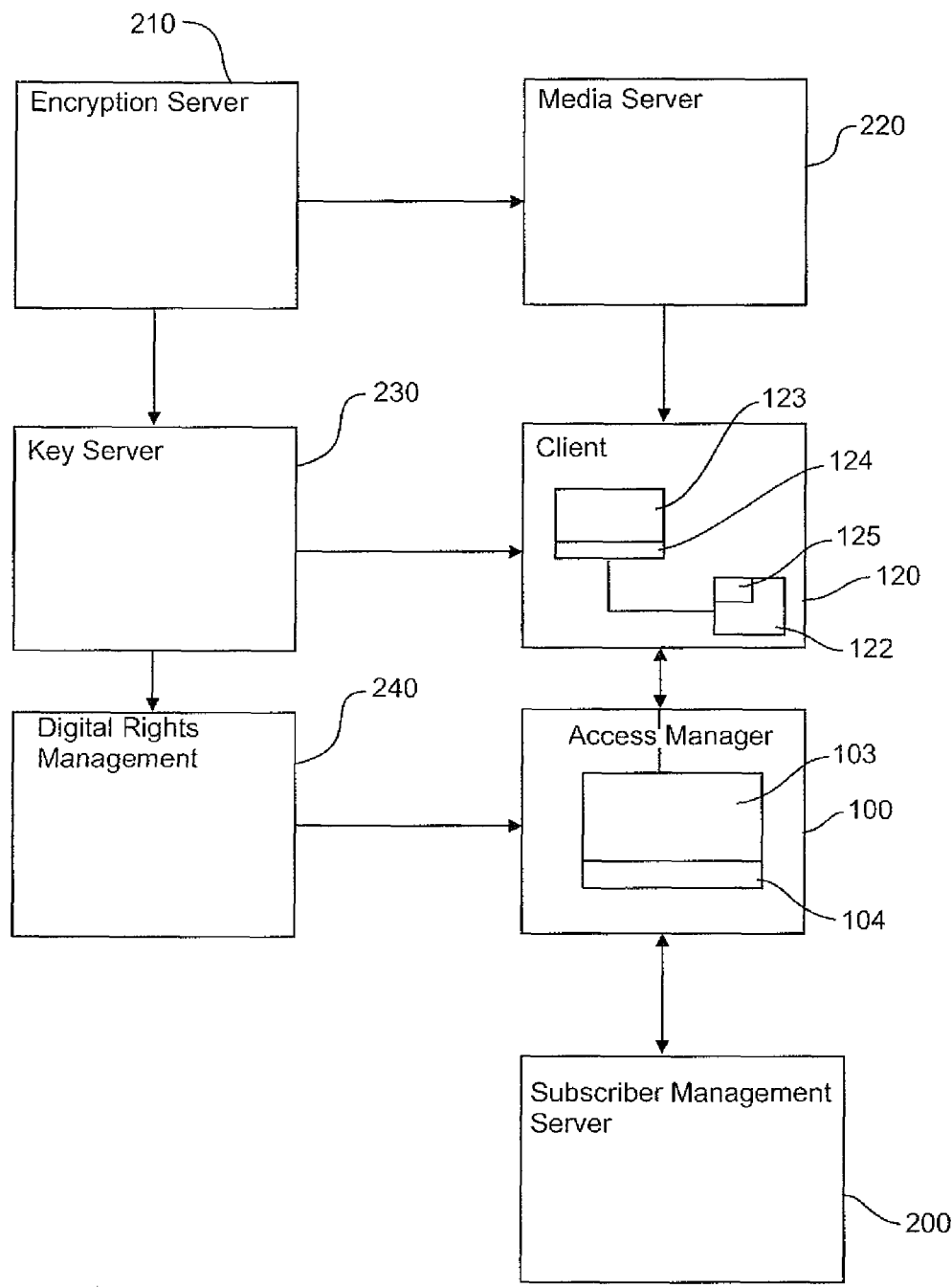
FIG. 2 is a schematic diagram showing a wider media delivery system in accordance with a preferred embodiment of the present invention.

FIG. 2 shows a complete online digital media delivery system incorporating a system in accordance with the present invention. The client 120 has the same internal processes running as the client described with reference to FIG. 1. The client 120 is connected over the Internet to an access manager server 100, as described with reference to FIG. 1, as well as to a media server 220 and an encryption Key server 230. The system also includes a DRM server 240 connected between the Key server and the access manager server 100, an Encryption server 210 for encrypting media works and creating keys connected to both the media server 220 and the Key server 230, and a Subscriber Management server 200 connected to the access manager server 100.

The system shown in FIG. 2 separates the delivery of media from the delivery of decryption keys and from the delivery of rights to access the keys and/or the media. The process used for encryption and for management of the media, keys and rights is not critical to the present invention and so will not be described in detail here. A preferred scheme is described in U.S. Pat. No. 7,076,067, the contents of which are incorporated herein by reference.

As shown in FIG. 2 a media provider registers a user. The Subscriber Management system 200 stores the registration details, including the client name, client identification, a password and billing details.

The access manager daemon requests the latest version of the blacklist from the access manager server 100 to be sent to the client blacklist scanner 124. This request is like a blacklist "ping" of the access manager server. The blacklist scanner checks the client 120 for any items on the blacklist that are active on the client 120.

As mentioned above, the items on the blacklist may have an associated priority level. The items perceived to have the greatest risk associated with them (typically because those items are most widespread) are checked for first. If no items with the highest priority are detected, then the access manager daemon 123 allows further transactions to proceed with the access manager server while the lower priority items on the blacklist are checked for. This allows the system to perform quickly and so be user friendly, while still providing adequate protection for the media work. In the preferred embodiment all checking is carried out in parallel with the DRM transactions.

The DRM processes and delivery of keys and the media work can proceed, as described in for example U.S. Pat. No. 7,076,067, the contents of which are incorporated herein by reference. This process is used as an example only and alternative DRM processes may be used without departing from the scope of the invention.

In this U.S. Pat. No. 7,076,067 the rights to receive keys are first sent to the client from the DRM server 240 via the access manager 103. The rights to receive keys may include the URL to access the media server 220, the URL to access the Key server 230 and tokens. Each token is single-use and is associated with a particular piece of media. The keys are then requested and downloaded to the client from the Key server 230 and used to decrypt the encrypted media work downloaded from the Media server 220. The blacklist may be downloaded as part of keys or token delivery payload.

In order to guard against threatening processes that are loaded after session set up with the Access Server, the blacklist scanner on the client checks the client for items on the blacklist throughout the process of obtaining rights and keys and playback of the media file. Repeat blacklist scans can be performed on a periodic basis. Alternatively scanning may be done continuously and cyclically. Various schemes may be employed using the priority levels associated with each item on the blacklist. For example, high priority items may be checked every few seconds whereas low priority items may be checked only on channel set up. In effect, there may be several different blacklists, divided based on priority, each blacklist processed on the client according to a different scheme.

The blacklist must be kept up-to-date in order to be effective. Ideally, the blacklist is updated centrally by a dedicated service and sent to the access manager 103. The access manager daemon 123 on the client 120 periodically, or based on transactions, requests an updated blacklist. This may be done as a blacklist "ping" in which the client sends the version of the blacklist that it has to the blacklist manager 104. The blacklist manager then returns an updated a list or a list of additions and deletions from the list on the client 120. Alternatively, an updated blacklist may be sent from the access manager to clients on a periodic basis during secure connection.

Figure 3:
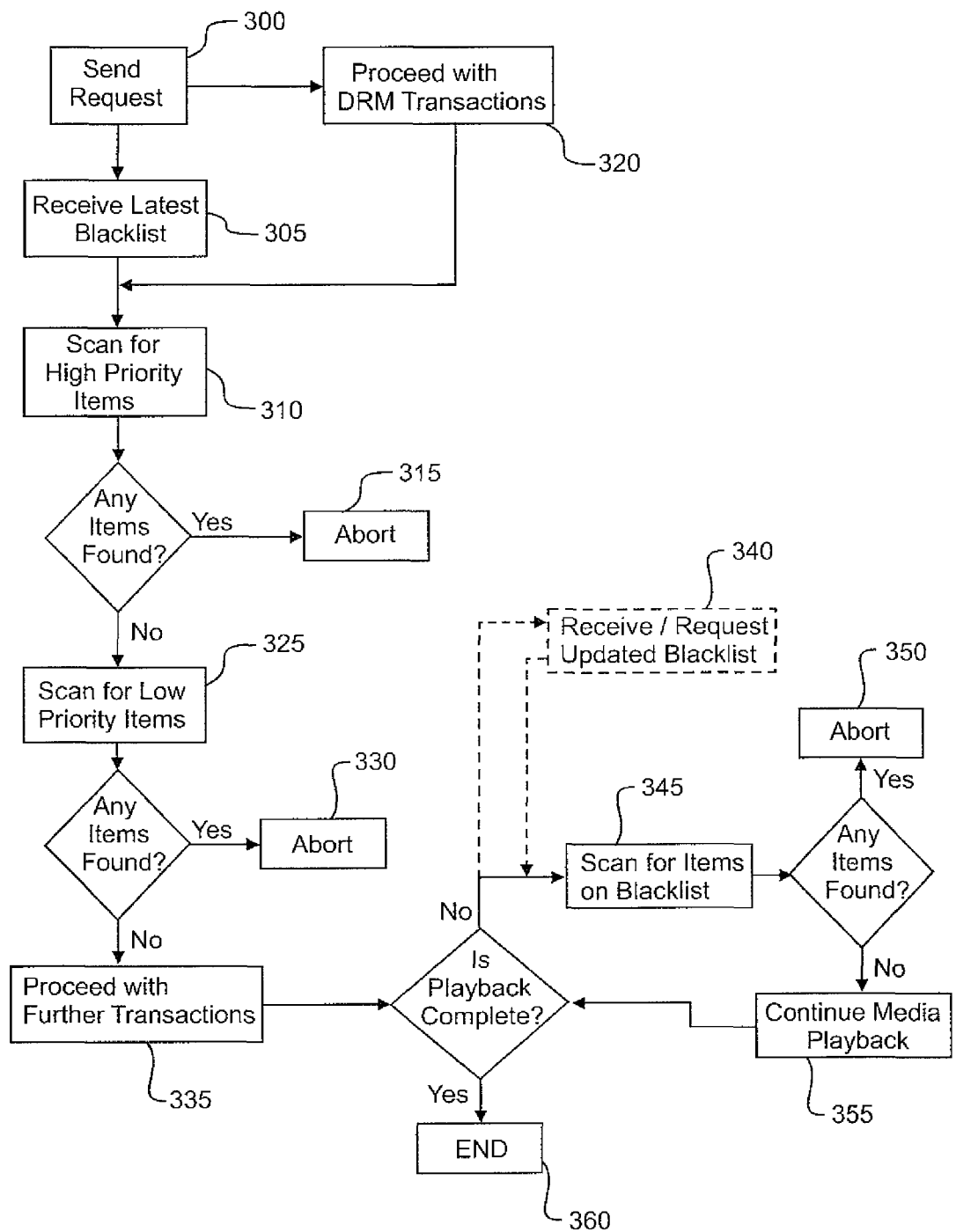
FIG. 3 is a flow diagram showing the steps undertaken on a client in an anti-piracy process in accordance with a non-gated example of the present invention.

FIG. 3 is a flow chart of the steps performed on the client for anti-piracy purposes in accordance with a non-gated embodiment of the present invention. At step 300 the client requests access to a media file. As part of the initial set up process described with reference to FIG. 2, at step 305 the client receives an updated blacklist from the access manager server. In parallel with receiving the latest blacklist the client proceeds with the necessary DRM transaction steps 320. This embodiment is non-gated as the DRM checks do not have to wait for the blacklist checks, both happen in parallel.

In a first scanning step 310, the blacklist scanner checks for high priority items on the blacklist active on the client. If any blacklisted items are active and detected on the client at step 310 then the process including the DRM transaction steps are aborted at step 315.

In step 325, the blacklist scanner checks the client for lower priority blacklist items.

If any blacklisted items are active and detected on the client at step 325 then the process is aborted at step 330.

If no blacklisted items are detected on the client at step 325 then further transactions proceed at step 335. These further transactions may include delivery of tokens and keys and media decryption and playback may begin. If playback of the media file is not complete, the client is scanned again. Step 340, the request for and/or the delivery of updated blacklist data is shown in a dotted outline as occurring after only a single scan of the client. However, the obtaining of an updated blacklist may only occur daily or during set-up of the connection or at any pre-configured interval.

At step 345 the client is scanned again by the blacklist scanner in case blacklisted items have become active following the initial scan. If any blacklisted items are active and detected in step 345, then media decryption and playback is aborted at step 350. If no blacklisted items are active and detected in step 345, then media decryption and playback is continued at step 355.

Figure 4:
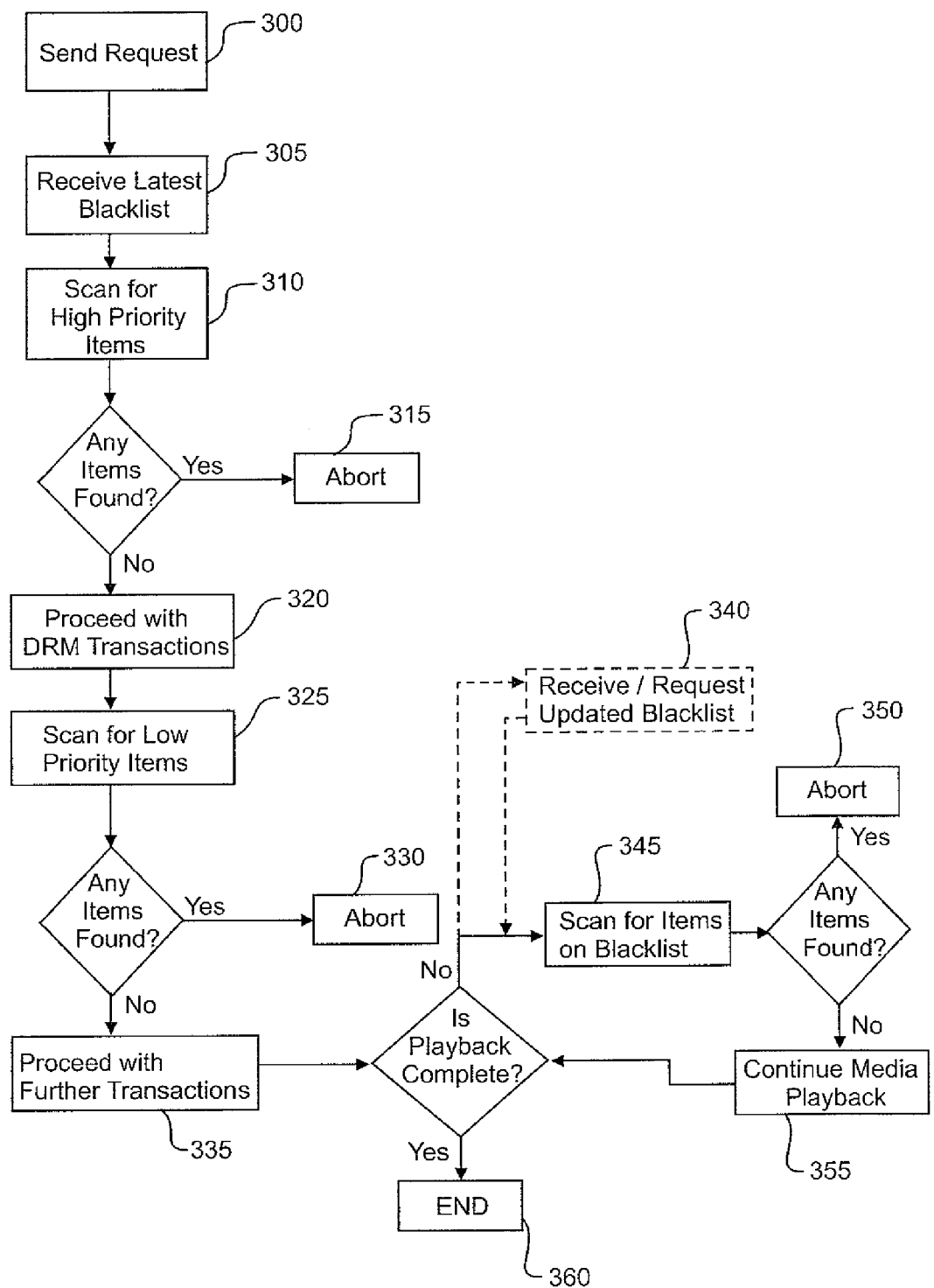
FIG. 4 is a flow diagram showing the steps undertaken on a client in an anti-piracy process in accordance with a gated example of the present invention.

FIG. 4 is a flow chart of the steps performed on the client for anti-piracy purposes in accordance with a gated embodiment of the present invention. In this embodiment, DRM checks do not proceed until at least some checking has been done and no blacklist items are found.

At step 300 the client requests access to a media file. As part of the initial set up process described with reference to FIG. 2, at step 305 the client receives an updated blacklist from the access manager server. In a first scanning step 310, the blacklist scanner checks for high priority items on the blacklist active on the client.

If any blacklisted items are active and detected on the client at step 310 then the process is aborted at step 315.

If no blacklisted items are detected on the client at step 310 then the client proceeds with the DRM transactions at step 320. Typically these further transactions include DRM steps. At the same time, in step 325, the blacklist scanner checks the client for lower priority blacklist items.

If any blacklisted items are active and detected on the client at step 325 then the process is aborted at step 330.

If no blacklisted items are detected on the client at step 325 then further transactions proceed at step 335. These further transactions may include delivery of tokens and keys and media decryption and playback may begin. If playback of the media file is not complete, the client is scanned again. Step 340, the request for and/or the delivery of updated blacklist data is shown in a dotted outline as occurring after only a single scan of the client. However, the obtaining of an updated blacklist may only occur daily or during set-up of the connection.

At step 345 the client is scanned again by the blacklist scanner in case blacklisted items have become active following the initial scan. If any blacklisted items are active and detected in step 345, then media decryption and playback is aborted at step 350. If no blacklisted items are active and detected in step 345, then media decryption and playback is continued at step 355.

Figure 6:
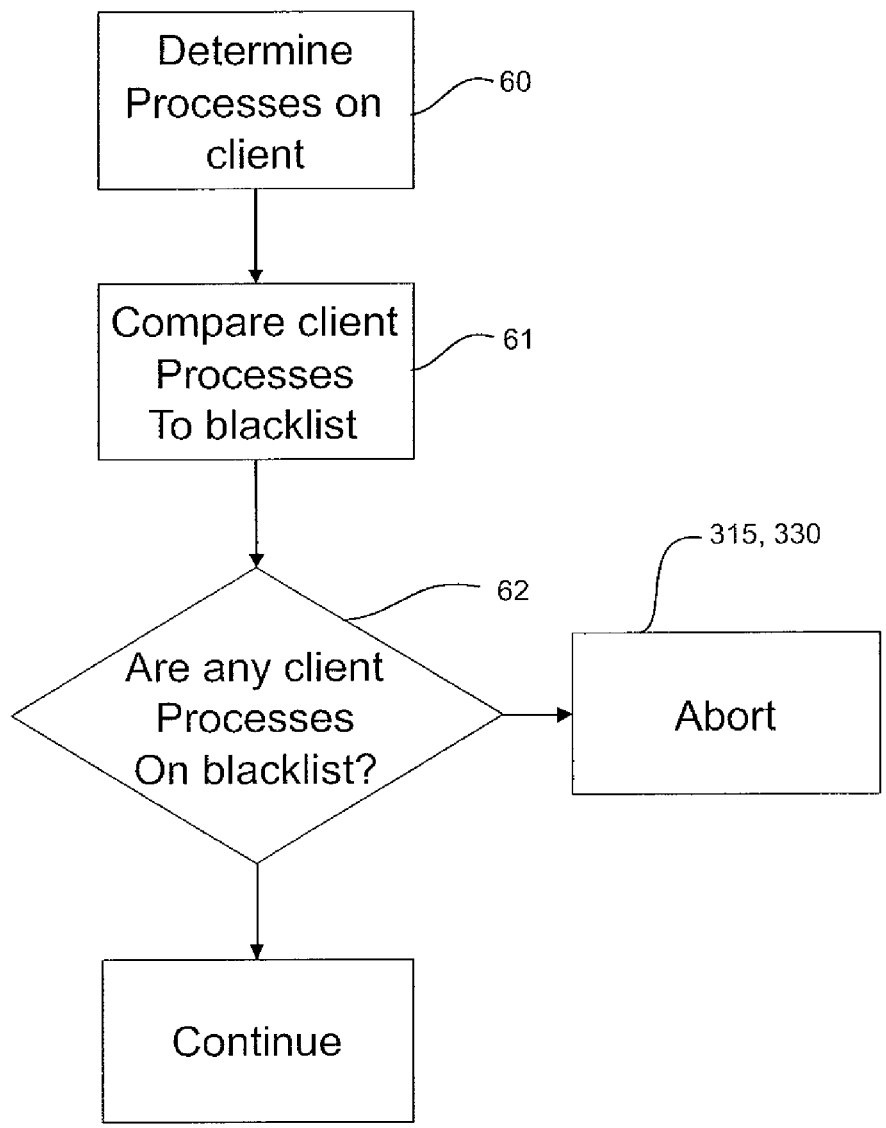
FIG. 6 is a flow diagram of a scanning process.

If playback of the media file is not complete, the client is scanned once again. Once playback of the media file is complete the media playback process ends, in step 360, scanning may continue. FIG. 5 shows a possible blacklist and FIG. 6 shows further detail of a scanning process using the blacklist. This shows in more detail the scanning process depicted in FIGS. 3 and 4. For example, the scanning process of FIG. 6 could be implemented in the "scan for high priority items", step 310, or the "scan for low priority times", step 325. The blacklist 104 contains a range of items, such as utilities, applications, processes, instructions, activity descriptions, data types and/or other processes that might exist on the client. Optionally, each black list item has a priority.

With reference to FIG. 6, the scanning works as follows. The processes on the client are determined, step 60. Then the processes are compared to the blacklist, step 61. Based on this, playback of content on the client is controlled. If there is one or more blacklist items running on the client, step 62, then the provision of the media is aborted, step 315/330 (as per FIG. 3 or 4). If there are no blacklist items on the client, step 62, then the playback continues.

If the blacklist contains priorities 51, then only some of the blacklist will be compared to the processes running on the client. This will depend on which priority items are being checked. For example, if a high priority scan is being undertaken (such as step 310 in FIGS. 3/4) then only the number 1 priority blacklist items will be checked for. If a low priority scan is being undertaken (such as step 325 in FIGS. 3/4), the only the number 2 priority blacklist items will be checked for. More than two priorities could be provided.

In an alternative embodiment, the black list comprises ratings/weightings for each item 70, such as shown in FIG. 7. A black list with ratings/weightings can be called a "greylist" 70—in effect, a greylist is a special case of a blacklist. A scan is conducted, which could be called a "greylist scan", although more generally is still called a black list scan that has further processing of ratings/weightings. Each item in the list has a rating or weighting 71. If an item in the greylist exists on the client, this will not necessarily abort the provision of media. This greylist scan process can be used in the place of scans of steps 310 and/or 325 of FIGS. 3 and 4.

Figure 8:
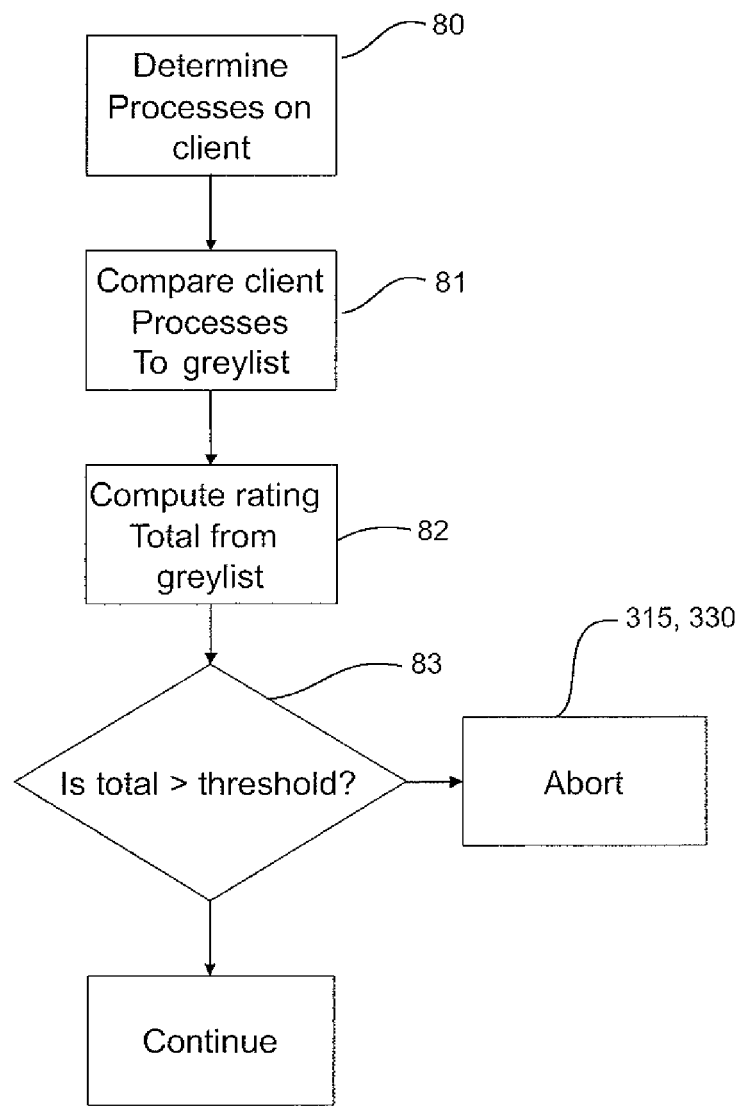
FIG. 8 is a flow diagram of a greylist scanning process.

Referring to FIG. 8, the grey list scan works in this manner. First, the items on the client are determined, step 80. These are then compared to the items on the greylist, step 81. If an item exists on the greylist, the corresponding rating/weighting is retrieved. The ratings/weightings of all grey list items running on the client are retrieved and added together or otherwise processed by a mathematical function to produce a total or resultant weighting, step 82. Based on this processing, playback of content on the client is controlled. If the total weighting is above a threshold, then the provision of media is aborted, step 315/330. A threshold might be 100, for example.

In this manner, the risk associated with a particular item is used in determining whether to abort the provision of media. A single low-risk item (e.g. Graph editor rating 10) would not be enough to reach the threshold, and therefore there would be no abort. But, a large number of low-risk items running on a client, or two or three high risk (e.g. screen scraper rating 50) items might be enough to breach the threshold and trigger and abort. This approach provides a more sophisticated way of determining when to abort the process, reducing "unwarranted" aborts.

It will of course be appreciated that any suitable rating system, threshold, and mathematical process for combing the ratings could be used for this invention.

The system and method of the present invention is equally applicable to broadcast media as it is to downloaded (on demand) media.

The present invention offers anti-piracy protection without any question of compromising client privacy. This makes it an attractive solution for end users. No data, apart from software version numbers and information required to complete authentication, is sent from the client to the access manager. No executable code, which might interfere or damage existing client systems, is downloaded onto the client after registration. Only blacklist data and data required for media playback is sent from the access manager server.

The present invention provides a flexible framework for anti-piracy measures. The level of security can be altered depending on the perceived level of threat.

The present invention can be integrated with DRM and key delivery functions in a media delivery system so threats can continue to be monitored during media playback and crucial DRM and key delivery steps can be terminated if a threat is detected.

The system might abort a process upon determining blacklist item on the client, or alternatively or additionally, the user might be alerted themselves. Diagnostics information could be recorded on the client and/or displayed to the user. Alternatively or additionally, diagnostics information could be sent to a service operator in order to assist the user in responding to detection of a blacklist item/abort.

The embodiments described comprise a blacklist that can be periodically updated. Uploads of partial threats or blacklists can occur. For example, to advise the client about "threats" A, B, C, four messages could be sent:

Message 1: A
Message 2: B
Message 3: Cb
Message 4: C2
Where threat C=C1+C2

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. A method for protecting digital media content from unauthorized use on a client, comprising the steps of:
   receiving from a server via a network at the client a blacklist identifying a plurality of piracy threatening items that pose a piracy threat such that if installed and active simultaneously with playback of the digital media content on the client the piracy threatening items facilitate unauthorized use of the digital media content, each piracy threatening item having an associated weighting value;
   provisioning the digital media content for playback on the client, the provisioning comprising receiving digital rights including decryption keys for the digital media content on the client;
   while receiving the digital rights and during delivery of digital media content:
      simultaneously checking on the client at predetermined intervals for the presence of any installed piracy threatening items on the blacklist; and
      responsive to detecting the presence of one or more of the piracy threatening items on the client, using a mathematical function to combine the weighting values associated with the detected one or more piracy threatening items to produce a resultant weighting, and evaluating the resultant weighting against a weighting threshold;
   aborting the provisioning of the digital media content responsive to the resultant weighting exceeding the threshold; and
   not aborting the provisioning of the digital media content responsive to the resultant weighting not exceeding the threshold.

2. A method for protecting digital media content from unauthorized use on a client according to claim 1, wherein the step of checking comprises checking on the client for the presence of any piracy threatening items on the blacklist that are active on the client.

3. A method for protecting digital media content from unauthorized use on a client according to claim 1, further comprising the step of periodically updating the blacklist.

4. A method for protecting digital media content from unauthorized use on a client according to claim 1, wherein the checking and evaluating is carried out substantially continuously.

5. A method for protecting digital media content from unauthorized use on a client according to claim 1, wherein the blacklist is received by the client along with the digital rights.

6. A system for protecting digital media content from unauthorized use in a client, comprising:
   a blacklist server comprising a non-transitory computer readable medium that provides instructions which, when executed by at least one processor, cause the processor to send to a client via a network a blacklist identifying a plurality of piracy threatening items that pose a piracy threat such that if installed and active on the client simultaneously with playback of the digital media content on the client the piracy threatening items facilitate unauthorized use of the digital media content, each piracy threatening item having an associated weighting value;
   wherein the client receives the blacklist via the network;
   wherein the client provisions the digital media content for playback on the client, the provisioning comprising receiving digital rights including decryption keys for the digital media content on the client;
   wherein the client, while receiving the digital rights and during delivery of digital media content:
      simultaneously runs a checking process at predetermined intervals that checks for the presence of any installed piracy threatening items on the blacklist on the client; and
      responsive to the detecting the presence of one or more of the piracy threatening items on the client, uses a mathematical function to combine the weighting values associated with the detected one or more threatening items to produce a resultant weighting, and evaluates the resultant weighting against a weighting threshold;
   wherein the client aborts the provisioning of the digital media content responsive to the resultant weighting exceeding the threshold; and wherein the client does not abort the provisioning of the digital media content responsive to the resultant weighting not exceeding the threshold.

7. A system for protecting digital media content from unauthorized use in a client according to claim 6, wherein the client further receives digital rights information from the blacklist server.

8. A system for protecting digital media content from unauthorized use in a client according to claim 6, wherein the checking comprises checking on the client for the presence of any piracy threatening items on the blacklist that are active on the client.

9. A system for protecting digital media content from unauthorized use in a client according to claim 6, wherein the blacklist server further periodically sends an updated blacklist to the client and the client runs a checking process that checks for the presence of any threatening items on the updated blacklist.

10. A system for protecting digital media content from unauthorized use in a client according to claim 6, wherein the checking and evaluating is carried out substantially continuously.

11. A system for protecting digital media content from unauthorized use in a client according to claim 6, wherein the blacklist is received by the client along with the digital rights.

12. At least one non-transitory computer readable medium that provides instructions for preventing unauthorized use of digital media content, which, when executed by at least one processor on a client, causes the processor to perform the steps of:

receiving from a server a blacklist identifying a plurality of piracy threatening items that pose a piracy threat such that if installed and active simultaneously with playback of the digital media content on the client the piracy threatening items facilitate unauthorized use of the digital media content, each piracy threatening item having an associated weighting value;

provisioning the digital media content for playback on the client, the provisioning comprising receiving digital rights including decryption keys for the digital media content on the client;

while receiving the digital rights and during delivery of digital media content:

simultaneously checking the client at predetermined intervals for the presence of any installed piracy threatening items on the blacklist; and responsive to the checking detecting the presence of one or more of the piracy threatening items on the blacklist, using a mathematical function to combine the weighting values associated with the detected one or more piracy threatening items to produce a resultant weighting, and evaluating the resultant weighting against a weighting threshold;

aborting the provisioning of the digital media content responsive to the resultant weighting exceeding the threshold; and not aborting the provisioning of the digital media content responsive to the resultant weighting not exceeding the threshold.

13. At least one non-transitory computer readable medium according to claim 12, wherein the checking comprises checking on the client for the presence of any piracy threatening items on the blacklist that are active on the client.

14. At least one non-transitory computer readable medium according to claim 12, further comprising the step of periodically updating the blacklist.

15. At least one non-transitory computer readable medium according to claim 12, wherein the checking and evaluating is carried out substantially continuously.

16. At least one non-transitory computer readable medium according to claim 12, wherein the blacklist is received by the client along with the digital rights.

* * * * *